US012619248B2

(12) United States Patent
Nagura et al.

(10) Patent No.: US 12,619,248 B2
(45) Date of Patent: May 5, 2026

(54) REMOTE ASSISTANCE DEVICE AND METHOD FOR REMOTELY ASSISTING DRIVING OF AUTONOMOUS DRIVING VEHICLES

(71) Applicant: DENSO CORPORATION, Kariya-city (JP)

(72) Inventors: Toru Nagura, Kariya-city (JP); Yasuhiro Hirayama, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 49 days.

(21) Appl. No.: 18/409,589

(22) Filed: Jan. 10, 2024

(65) Prior Publication Data

US 2024/0184303 A1     Jun. 6, 2024

Related U.S. Application Data

(63) Continuation of application No. PCT/JP2022/023664, filed on Jun. 13, 2022.

(30) Foreign Application Priority Data

Jul. 12, 2021    (JP) ................................. 2021-115164

(51) Int. Cl.
*G05D 1/227*        (2024.01)
*G05D 1/617*        (2024.01)
        (Continued)

(52) U.S. Cl.
CPC ........... *G05D 1/2279* (2024.01); *G05D 1/617* (2024.01); *G05D 1/65* (2024.01); *G05D 1/69* (2024.01); *G05D 2109/10* (2024.01)

(58) Field of Classification Search
CPC ........ G05D 1/2279; G05D 1/65; G05D 1/617; G05D 1/69; G05D 2109/10
        (Continued)

(56) References Cited

U.S. PATENT DOCUMENTS

| | | | | |
|---|---|---|---|---|
| 10,268,191 B1* | 4/2019 | Lockwood | ........... | G05D 1/2279 |
| 10,775,783 B2* | 9/2020 | Lawler | ................. | G05D 1/2279 |

(Continued)

FOREIGN PATENT DOCUMENTS

JP        2019160146        9/2019

OTHER PUBLICATIONS

G. Selvaraj and J. J. Pillai, "Remote Assistance for Autonomous Vehicles," 2022 IEEE 19th India Council International Conference (INDICON), Kochi, India, 2022, pp. 1-6. https://ieeexplore.ieee.org/document/10039961 (Year: 2022).*

(Continued)

*Primary Examiner* — Matthias S Weisfeld
*Assistant Examiner* — Hyang Ahn
(74) *Attorney, Agent, or Firm* — Precision Patents, P.C.

(57)        ABSTRACT

A remote assistance device for remotely assisting autonomous driving of an autonomous driving vehicle, includes a control unit configured to, when there is no available operator or when it is predicted that there will be no available operator that provides remote assistance to the autonomous driving vehicle, control driving of the autonomous driving vehicle so as to prevent occurrence of a shortage of operators at an assistance point where the autonomous driving vehicle receives remote assistance.

20 Claims, 13 Drawing Sheets

(51) Int. Cl.
| | |
|---|---|
| *G05D 1/65* | (2024.01) |
| *G05D 1/69* | (2024.01) |
| *G05D 109/10* | (2024.01) |

(58) Field of Classification Search
USPC ........................................................... 701/2
See application file for complete search history.

(56) References Cited

U.S. PATENT DOCUMENTS

| | | | | |
|---|---|---|---|---|
| 11,022,978 | B1 * | 6/2021 | Konrardy ............... | G05D 1/247 |
| 11,396,302 | B2 * | 7/2022 | Ye .......................... | G06V 20/54 |
| 2015/0248131 | A1 * | 9/2015 | Fairfield .............. | G05D 1/0038 |
| | | | | 701/2 |
| 2018/0365908 | A1 * | 12/2018 | Liu ........................ | G05D 1/227 |
| 2020/0326702 | A1 | 10/2020 | Iwamoto et al. | |
| 2021/0216066 | A1 | 7/2021 | Shimontani et al. | |
| 2022/0221855 | A1 | 7/2022 | Mori et al. | |

OTHER PUBLICATIONS

R. -T. Juang, "The Implementation of Remote Monitoring for Autonomous Driving," 2019 4th Asia-Pacific Conference on Intelligent Robot Systems (ACIRS), Nagoya, Japan, 2019, pp. 53-56. https://ieeexplore.ieee.org/document/8935978 (Year: 2019).*

\* cited by examiner

REMOTE ASSISTANCE DEVICE AND METHOD FOR REMOTELY ASSISTING DRIVING OF AUTONOMOUS DRIVING VEHICLES

CROSS-REFERENCE TO RELATED APPLICATION

This application is a continuation application of International Application No. PCT/JP2022/023664 filed Jun. 13, 2022 which designated the U.S. and claims priority to Japanese Patent Application No. 2021-115164 filed with the Japan Patent Office on Jul. 12, 2021, the contents of each of which are incorporated herein by reference.

BACKGROUND

Technical Field

This disclosure relates to a remote assistance device and a remote assistance method.

Related Art

A remote assistance system for providing remote assistance to vehicles is known, including a route planner that identifies a route for each vehicle to a destination via an assistance point where remote assistance is provided to the vehicle, and a predictor that predicts, based on the estimated time of arrival of the vehicle at the assistance point on the identified route, a timing for an operator to initiate providing remote assistance to the vehicle.

DESCRIPTION OF SPECIFIC EMBODIMENTS

Figure 1:
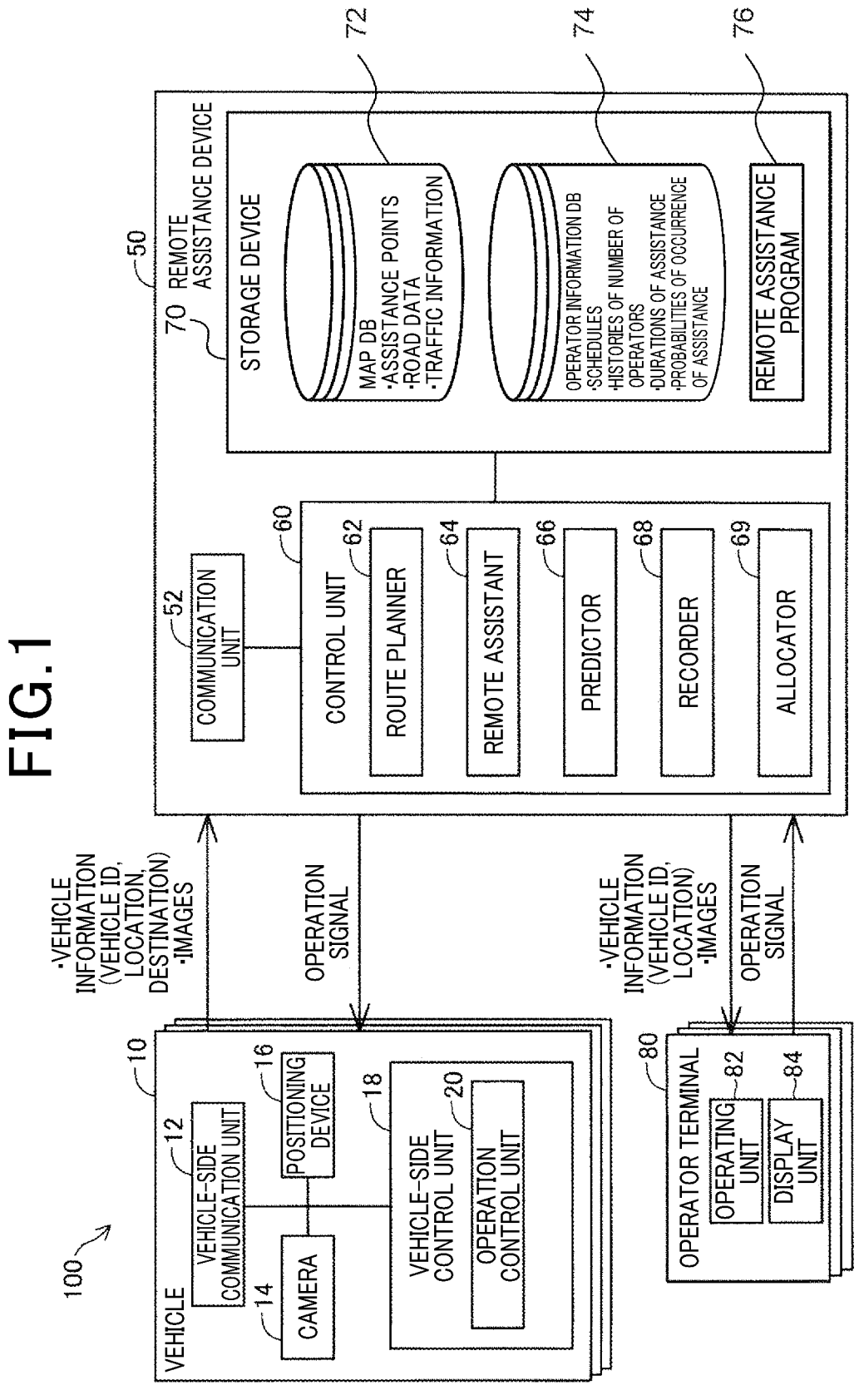
FIG. 1 is a schematic diagram of an autonomous driving system.

The technology of the above known remote assistance system, as disclosed in JP 2019-160146 A, is capable of providing remote assistance based on a long-term (of the order of hours) staffing plan by predicting the number of operators needed based on the vehicle's route plan.

However, there is an issue with the technology of the above known remote assistance system, that in cases where more persons are needed than expected due to an unexpected event or the like, the waiting time for assistance at the assistance points may increase.

In view of the foregoing, it is desired to have a remote assistance device capable of reducing a waiting time for assistance at each assistance point when there are no available operators or when it is predicted that there will be no available operators that remotely assist autonomous driving of autonomous driving vehicles.

A first aspect of the present disclosure provides a remote assistance device for remotely assisting autonomous driving of an autonomous driving vehicle. The remote assistance device includes a control unit configured to, when there is no available operator or when it is predicted that there will be no available operator that provides remote assistance to the autonomous driving vehicle, control driving of the autonomous driving vehicle so as to prevent occurrence of a shortage of operators at an assistance point where the autonomous driving vehicle receives remote assistance.

A second aspect of the present disclosure provides a computer-implemented method for remotely assisting autonomous driving of an autonomous driving vehicle. This method includes, when there is no available operator or when it is predicted that there will be no available operator that provides remote assistance to the autonomous driving vehicle, controlling driving of the autonomous driving vehicle so as to prevent occurrence of a shortage of operators at an assistance point where the autonomous driving vehicle receives remote assistance.

A third aspect of the present disclosure provides a non-transitory computer-readable medium comprising instructions for performing a method for remotely assisting autonomous driving of an autonomous driving vehicle. This method includes, when there is no available operator or when it is predicted that there will be no available operator that provides remote assistance to the autonomous driving vehicle, controlling driving of the autonomous driving vehicle so as to prevent occurrence of a shortage of operators at an assistance point where the autonomous driving vehicle receives remote assistance.

The remote assistance device according to the present disclosure can reduce a waiting time for assistance at each assistance point when there are no available operators or when it is predicted that there will be no available operators that remotely assist in autonomous driving of autonomous driving vehicles.

Hereinafter, some embodiments of the disclosure will be described with reference to the accompanying drawings.

As illustrated in FIG. 1, an autonomous driving system 100 of the present embodiment includes vehicles 10, a remote assistance device 50 disposed in an autonomous driving center, and operator terminals 80 operated by operators. Each vehicle 10 of the present embodiment is an autonomous driving vehicle that is driven automatically. The autonomous driving system 100 is configured so that the operator at a remote location provides remote assistance to the vehicle 10 when the vehicle 10 arrives at a predefined assistance point.

In the present embodiment, remote assistance refers to the operator operating the vehicle 10 from a remote location or the operator monitoring the vehicle 10 from a remote location. The assistance point refers to a location where it is difficult for the vehicle 10 to perform autonomous driving assistance, or where the operator can provide remote assistance to the vehicle. Assistance points include, but are not limited to, intersections, construction sites, parking lots, highways, exclusive freeways, service areas, parking areas, baggage collection points, toll booths, and interchanges.

The autonomous driving system 100 of the present embodiment includes one or more vehicles 10. Each vehicle 10 includes a vehicle-side communication unit 12, a camera 14, a positioning device 16, and a vehicle-side control unit 18.

The vehicle-side communication unit 12 performs wireless communication with the remote assistance device 50.

The camera 14 captures images of the surroundings of the vehicle 10. In the present embodiment, the camera 14 captures images ahead of the vehicle 10.

The positioning device 16 includes a Global Positioning System (GPS) receiver or Global Navigation Satellite System (GNSS) receiver to determine the current location of the vehicle 10.

The vehicle-side control unit 18 controls the vehicle-side communication unit 12, the camera 14, and the positioning device 16. The vehicle-side control unit 18 is configured as a computer equipped with a CPU and a memory, and functions as an operation control unit 20 when the CPU executes a program stored in the memory.

The operation control unit 20 controls the operations (acceleration, deceleration, braking, and steering) of the vehicle based on remote control by the operator. The operation control unit 20 also transmits vehicle information, including identification information (vehicle ID) and location information of the vehicle 10, to the remote assistance device 50 repeatedly at predefined time intervals through the vehicle-side communication unit 12. The vehicle information may include information for identifying the vehicle type and occupants of the vehicle 10, as well as destination location information. When the vehicle 10 is remotely assisted by an operator, the operation control unit 20 transmits the images captured by the camera 14 to the remote assistance device 50 and the operator terminal 80 via the vehicle-side communication unit 12.

The remote assistance device 50 includes a communication unit 52, a control unit 60, and a storage device 70.

The communication unit 52 performs wireless communication with the vehicles 10. The communication unit 52 also performs wired or wireless communication with the operator terminals 80.

The storage device 70 stores a map database 72, an operator information database 74, and a remote assistance program 76.

The map database 72 records locations of assistance points. The map database 72 also includes road data indicating intersections and road connections, traffic congestion information, traffic regulation information, and traffic information including a traffic volume at each assistance point. The traffic information is, for example, acquired and stored from other servers via the communication unit 52.

The operator information database 74 records, for example, the number of operators currently available among the operators who provide remote assistance to the vehicles, and other information.

The control unit 60 controls the communication unit 52 and the storage device 70. The control unit 60 includes, as functional blocks, a route planner 62, a remote assistant 64, a predictor 66, a recorder 68, and an allocator 69.

The route planner 62 identifies a route for each of the vehicles 10 to travel. More specifically, the route planner 62 identifies a route for each vehicle 10 to travel from a departure location to a destination location while passing through an assistance point, based on the road data, the traffic information, and the location of the assistance point recorded in the map database 72. The departure, destination, and assistance point through which the vehicle 10 travels may be set, for example, by an operator or his/her administrator, or according to a request from a passenger. The route planner 62 distributes the identified route to each of the vehicles 10 via the communication unit 52. Identification of the route may be performed in the vehicle-side control unit 18 of each vehicle 10. Identification of the route may also be performed according to a request from each of the vehicles 10.

The remote assistant 64 provides remote assistance to each vehicle 10 at an assistance point based on operations by an operator. For example, upon determining that the vehicle 10 has arrived at the assistance point, based on the location information transmitted from the vehicle 10, or upon receiving a remote assistance request from the vehicle 10, the remote assistant 64 receives an operation signal from the operator terminal 80 of the operator, and based on that operation signal, the remote assistant 64 performs remote assistance for the vehicle 10 at the assistance point. During remote assistance, the operator terminal 80 receives vehicle information and images captured by the camera 14 installed in the vehicle 10 from the remote assistance unit 64.

The predictor 66 predicts a timing for the operator to initiate remote assistance for the vehicle 10 based on the estimated arrival time of the vehicle 10 at the assistance point on the route identified by the route planner 62, and also predicts a duration of remote assistance. The predictor 66 may, for example, learn the relationship between past duration of remote assistance and traffic volume for each assistance point and predict the duration of remote assistance based on the learning result and the current traffic volume. The predictor 66 of the present embodiment has a function of predicting the number of operators to assist a plurality of vehicles simultaneously based on the estimated arrival time at the assistance point on the route identified for each of the 10 vehicles.

The recorder 68 records a history of the number of operators who have provided remote assistance at each time slot in the operator information database 74. The recorder 68 also records, for each assistance point, a history of the duration of remote assistance for each of operators having remotely assisted the vehicle 10 at the assistance point, in the operator information database 74. The recorder 68 also records a history of the traffic volume for each assistance point in the operator information database 74. The recorder 68 also calculates the probability of occurrence of assistance for each assistance point based on the history of past remote assistance and records the calculated probability in the operator information database 74. The recorder 68 also records contents of assistance in the operator information database 74. The contents of assistance are, for example, right turn assistance and left turn assistance at intersections, door opening/closing assistance and launching assistance at bus stops, and the like.

The allocator 69 allocates operators to assistance points on the route of each vehicle 10 based on the initiation timing of remote assistance as predicted by the predictor 66.

Figure 2:
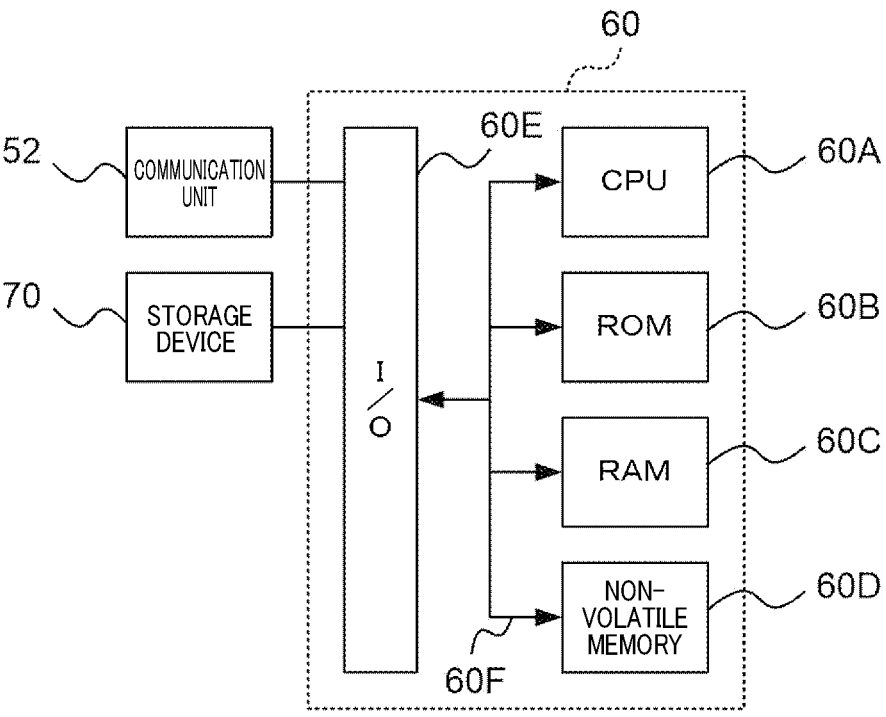
FIG. 2 is a schematic of a hardware configuration of a remote assistance device.

FIG. 2 schematically illustrates a hardware configuration of the control unit 60. The control unit 60 is configured as including a typical computer.

As illustrated in FIG. 2, the control unit 60 includes a central processing unit (CPU) 60A, a read only memory (ROM) 60B, a random access memory (RAM) 60C, a non-volatile memory 60D, and an input/output interface (I/O) 60E. The CPU 60A, ROM 60B, RAM 60C, non-volatile memory 60D, and I/O 60E are connected via a bus 60F. The I/O 60E is connected to the communication unit 52 and the storage device 70.

The CPU 60A is an example of a computer. The term "computer" here refers to a processor in the broadest sense, and includes a general-purpose processor (e.g., CPU), a specific-purpose processor (e.g., a graphics processing unit (GPU), an application specific integrated circuit (ASIC), a field programmable gate array (FPGA), a programmable logic device, etc.).

The storage device 70 is configured as a non-volatile storage device, such as a hard disk. The CPU 60A loads and executes the remote assistance program 76 stored in the storage device 70. The CPU 60A thereby functions as the functional blocks of the control unit 60. The remote assistance program 76 may be implemented by being stored in a non-volatile non-transitory storage medium or distributed over a network and thereby installed in the remote assistance device 50 as appropriate.

Examples of a non-volatile non-transitory storage medium may include a compact disc-read only memory (CD-ROM), a magneto-optical disk, a hard disk drive (HDD), a digital versatile disc-read only memory (DVD-ROM), a flash memory, a memory card, etc.

The operator terminal 80 is configured as a computer or mobile terminal including a CPU and a memory. The autonomous driving system 100 of the present embodiment includes one or a plurality of operator terminals 80. Each operator terminal 80 includes an operating unit 82 and a display unit 84. The operating unit 82 receives operations for remotely assisting a vehicle 10 from an operator. The received operation is transmitted to the vehicle 10 via the remote assistance device 50 as an operation signal. The display unit 84 displays a user interface provided for the operation by the operator. The display unit 84 displays the images captured by the camera 14 transmitted from the vehicle 10.

Figure 3:
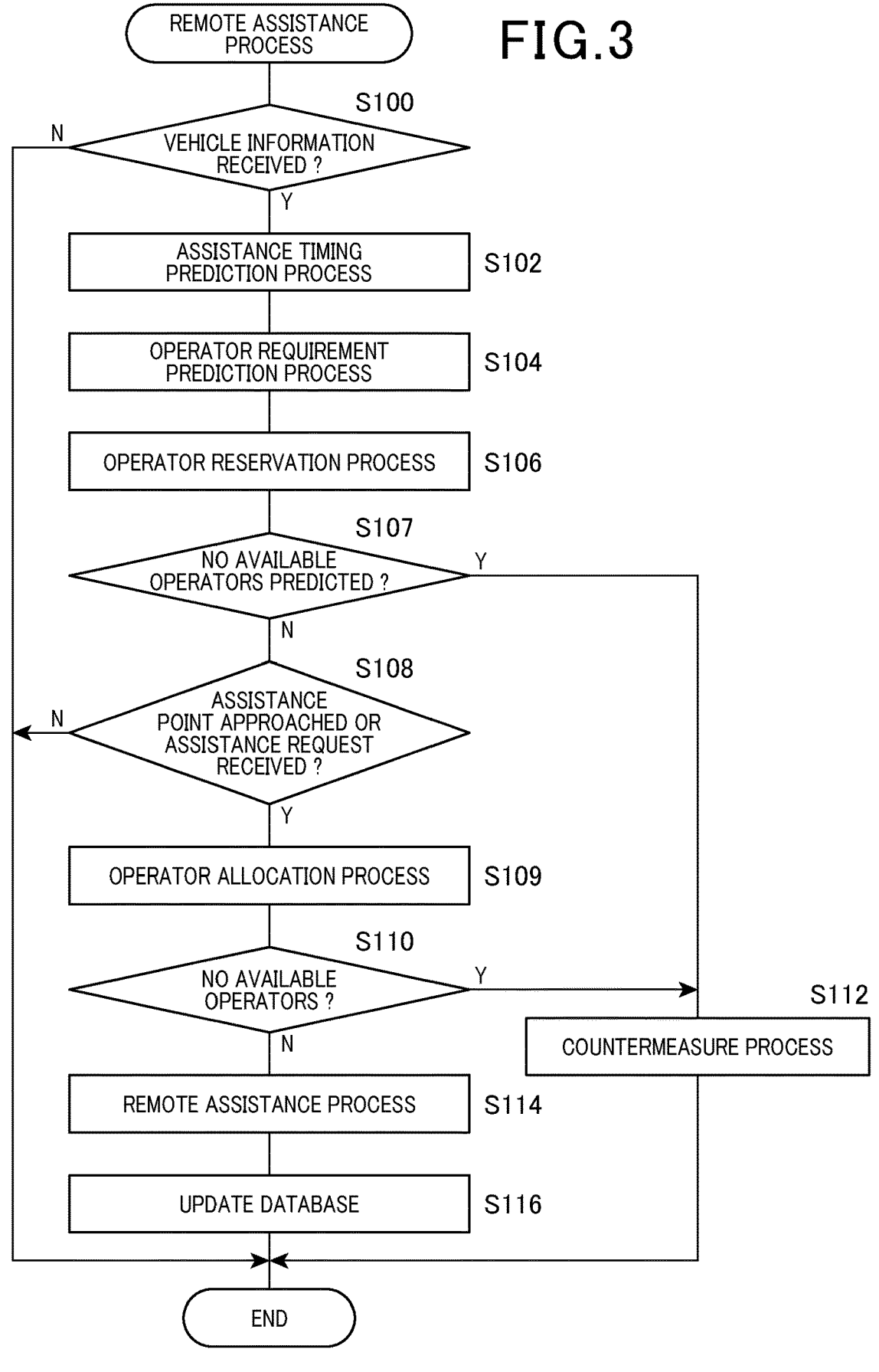
FIG. 3 is a flowchart of a remote assistance process.

A remote assistance process performed by the control unit 60 of the autonomous driving system 100 will now be described with reference to FIG. 3. The remote assistance process illustrated in FIG. 3 is a process performed repeatedly in the remote assistance device 50 at predefined time intervals while the autonomous driving system 100 is in operation. In the following, it is assumed that a route for each vehicle 10 has been identified by the route planner 62.

At step S100, the control unit 60 determines whether the vehicle information has been received from each vehicle 10. As described above, the vehicle information is transmitted periodically from each vehicle 10, where the vehicle information includes identification information (vehicle ID) and vehicle location information of the vehicle 10.

If the vehicle information has not been received, the control unit 60 terminates this routine, and if the vehicle information has been received, the control unit 60 proceeds to step S102.

At step S22, the control unit 60 performs an assistance timing prediction process. Here, the assistance timing prediction process is a process of predicting when to initiate remote assistance by an operator based on the route of the vehicle 10 identified by the route planner 62 and the vehicle information received from the vehicle 10.

Once the route of each vehicle 10 is identified, the estimated arrival time of the vehicle 10 at the assistance point is identified. In addition, the actual location information of the vehicle 10 at the present time is known when vehicle information is received from the vehicle 10. Therefore, at step S102, the control unit 60 updates, based on real-time location information of each vehicle 10, the arrival time at each assistance point.

At step S102, the control unit 60 also updates the result of prediction of the timing when remote assistance is to be initiated by the operator, based on the updated arrival time. In the present embodiment, the control performance unit 60 predicts the timing when the vehicle 10 arrives at the assistance point as the timing when remote assistance is to be initiated by the operator. The timing when remote assistance is to be initiated by the operator may not have to be the same as the timing when the vehicle 10 arrives at the assistance point. For example, the timing may be earlier or later than the timing when the vehicle 10 arrives at the assistance point.

At step S104, the control unit 60 performs an operator requirement prediction process. This operator requirement prediction process is a process of predicting the number of operators required at each time slot from the present time into the future.

At step S104, since the number of vehicles that will undergo remote assistance at the same time slot can be identified from the estimated arrival time of each vehicle at the assistance point and the duration of remote assistance at that assistance point, the control unit 60 predicts that number of vehicles as the number of required operators. However, in order to allow room for prediction errors and operator breaks, the predicted number of operators may be given a margin in advance.

The manager may have a rough estimate of the number of operators required at each time slot of a day prior to the day's work, according to the history of the number of operators in the past, e.g., at the same time slot of the day in the past, or at the same time slot of the day on the same day of the week in the past.

At step S106, the control unit 60 performs an operator reservation process. In the operator reservation process, the control unit 60 determines whether operator's assistance needs to be reserved based on a probability of occurrence of assistance, which is calculated for each assistance point based on the history of past remote assistance, and a priority, which represents a level of importance when assistance is necessary and is set according to the content of assistance, and if operator's assistance is necessary, the control unit 60 makes a reservation for assistance. For example, if the priority is higher than or equal to a threshold, it is determined that a reservation is necessary. On the other hand, if the priority level is less than the threshold, the control unit 60 determines whether operator's assistance needs to be reserved by referring to a reservation necessity determination table that indicates a correspondence between the probability of occurrence of assistance, the priority, and whether a reservation is necessary. The method of determining whether operator's assistance needs to be reserved is not limited to this manner.

At step S107, the control unit 60 determines whether it is predicted that there will be no more available operators. The case where it is predicted that there will be no more available operators means that there is a schedule in which the number of available operators will be less than the number of vehicles 10 for which it is determined at step S106 that remote assistance is necessary.

If it is predicted that there will be no more available operators, the control unit 60 then proceeds to step S112. On the other hand, if it is predicted that there will be an available operator, the control unit 60 moves to step S108.

At step S108, the control unit 60 determines, based on the vehicle information received from each vehicle 10, whether there is a vehicle 10 approaching an assistance point or whether an assistance request has been received from a vehicle 10. For example, the remote assistance device 50 determines that a vehicle 10 has approached an assistance point when it is predicted that the vehicle 10 will arrive at the next assistance point on the route of the vehicle 10 within a predefined time (e.g., 10 seconds).

If there is a vehicle 10 approaching an assistance point or an assistance request has been received from a vehicle 10, the control unit 60 proceeds to step S109. If there is no vehicle 10 approaching the assistance point and no assistance request has been received from any vehicle 10, the control unit 60 terminates this routine.

At step S109, the control unit 60 performs an operator allocation process. The operator allocation process is a process of allocating operators to the vehicles 10 in need of remote assistance.

At step S110, the control unit 60 determines whether there are no available operators at the present time. The case where there are no available operators at the present time means that the number of available operators at the present time is less than the number of vehicles 10 in need of remote assistance, and there is a vehicle 10 that fails to be provided with remote assistance.

If there are no available operators at the present time, the control unit 60 proceeds to step S112. On the other hand, if there is an available operator, the control unit 60 proceeds to step S114.

At step S112, the control unit 60 performs a countermeasure process if there are no available operators or if it is predicted that there will be no available operators. The details of the countermeasure process will be discussed later.

At step S114, the control unit 60 performs the remote assistance process. The operator performs operations for remotely assisting the vehicle 10 using the operator terminal 80 as soon as the vehicle 10 arrives at the assistance point or as soon as an assistance request is received from the vehicle 10. Accordingly, at step S114, the control unit 60 performs remote assistance by receiving an operation signal from the operator terminal 80 and transferring the operation signal to the vehicle 10. The operation signal for remote assistance may be directly transferred from the operator terminal 80 to the vehicle 10 without passing through the remote assistance device 50.

At step S116, the control unit 60 performs a database update process. In the database update process, the control unit 60 updates the operator information database 74 by recording in the operator information database 74 the duration from the start to end of remote assistance performed at step S114 and the number of operators who provided remote assistance.

In the following, a specific example of the countermeasure process will now be described.

As the countermeasure process, the control unit 60 controls operations of the vehicles 10 so that a situation does not occur where there are no more available operators at each assistance point.

When the number of available operators is less than the number of occurrences of remote assistance scheduled to occur at the same time, for example due to unexpected assistance, changes in route settings or operation schedules, etc., a specific number of vehicles are selected where the specific number is equal to the shortage number of operators, and the selected vehicles are each instructed to stop, wait at a bus stop, travel at a lower speed, or change its route.

Vehicle instructions are provided to the vehicles with a shortage of operators, among the vehicles for which remote assistance is predicted to occur, in the order of the vehicles with the least impact on the feasibility of services related to autonomous driving. However, when there are a plurality of vehicles with the same impact on feasibility of the services, the vehicle with the lowest prediction accuracy for the duration of assistance, that is, the vehicle farthest from the assistance point, is selected, and if the impact on feasibility of the services does not change depending on the timing of providing instructions, the instruction is provided when the prediction accuracy becomes higher, that is, when the vehicle approaches the assistance point. This may prevent ineffective instructions due to low prediction accuracy from being provided.

Vehicle instructions are provided to the vehicles with a shortage of operators, among the vehicles for which assistance is predicted to occur, in the order of the vehicles with the least impact on safety and the feasibility of services related to safety and autonomous driving. However, when there is a vehicle with a low probability of occurrence of assistance, the vehicles that can be handled are selected after the presence or absence of assistance for that vehicle has been determined. This can prevent ineffective vehicle instructions due to low probability of occurrence of assistance, from being provided.

By the way, the more the extra time until remote assistance is initiated, the more likely it is that the choice of instructions to be provided to the vehicles increases. Basically, it is considered that instructions that can be handled in advance, such as changing the route, have a smaller impact on the feasibility of the services related to autonomous driving, for example, congestion on the surrounding roads or the bus operation plans, than, for example, an emergency stop of the vehicle when there is no longer an available operator.

Accordingly, when there are no available operators or it is predicted that there will be no available operators and the vehicle instruction is selectable from plural ones, the instruction may be provided to the vehicle according to the length of time period before remote assistance is initiated.

For example, when the time period before remote assistance is initiated is relatively short, it is basically better to provide a first instruction such as stopping the vehicle. When the time period before remote assistance is initiated is relatively long, it is better to provide a second instruction such as changing the route. Therefore, when there are no available operators or it is predicted that there will be no available operators, the second instruction to travel to the bus stop and stop the vehicle may be prioritized over the first instruction to make an emergency stop of the vehicle. The second instruction to travel at a slower speed may be prioritized over the first instruction to make an emergency stop of the vehicle. The second instruction to change the route may be prioritized over the first instruction to make an emergency stop of the vehicle. The second instruction to change the route may be prioritized over the first instruction to evacuate the vehicle to a safe zone. The second instruction to change the route may be prioritized over the first instruction to stop the vehicle at a bus stop.

When there are no available operators or it is predicted that there will be no available operators and the vehicle instruction is selectable from plural ones, the vehicle instruction may be selected according to the impact on the feasibility of the services related to autonomous driving. For example, the instruction with the minimum impact on the services related to autonomous driving may be selected according to the vehicle. For example, in a case where the vehicle is a bus, the first instruction to stop the vehicle at a bus stop may be prioritized over the second instruction to change the route. This is because changing the route in the case where the vehicle is a bus would have a greater impact on the punctuality of the bus and the surrounding traffic. It should be noted that, even when the first instruction is selected, the second instruction may eventually have a smaller impact in the event of a change in situation, such as occurrence of additional unexpected assistance. Thus, the second instruction may be selected when the probability of occurrence of assistance is high or when the probability of occurrence of assistance is unknown. For example, providing the second instruction to instruct a vehicle A to change the route instead of the first instruction to instruct the vehicle A to stop at a bus stop eliminates the need for remote assistance, and in the event of unexpected occurrence of assistance from a vehicle B, can prevent the vehicle A from waiting at the bus stop for a long time or instructing the vehicle B to make an emergency stop.

The instructions may also be selected to minimize the impact on the overall service in which a plurality of vehicles are involved. This is because the impact may not be minimal when looking at instructions to individual vehicles alone. For example, when there are no available operators or it is predicted that there will be no available operators, the impact on individual vehicles may be minimized by instructing both the vehicle A and the vehicle B to stop at a bus stop rather than instructing them to change their routes. However, when the assistance periods overlap, either the vehicle A or the vehicle B may be instructed to change its route or to travel at a slower speed. This can eliminate the overlap of the assistance periods and reduce a waiting time at the bus stop, resulting in improved punctuality and minimizing the impact on the overall service.

Although the instruction to each vehicle is basically based on the most recent prediction of occurrence of assistance so that an update of the instruction to the vehicle does not occur, the location of the vehicle may be monitored and the instruction to the vehicle may be updated if the prediction of occurrence of assistance is not met.

Specific examples will now be described in the following.

First Example

Figure 4:
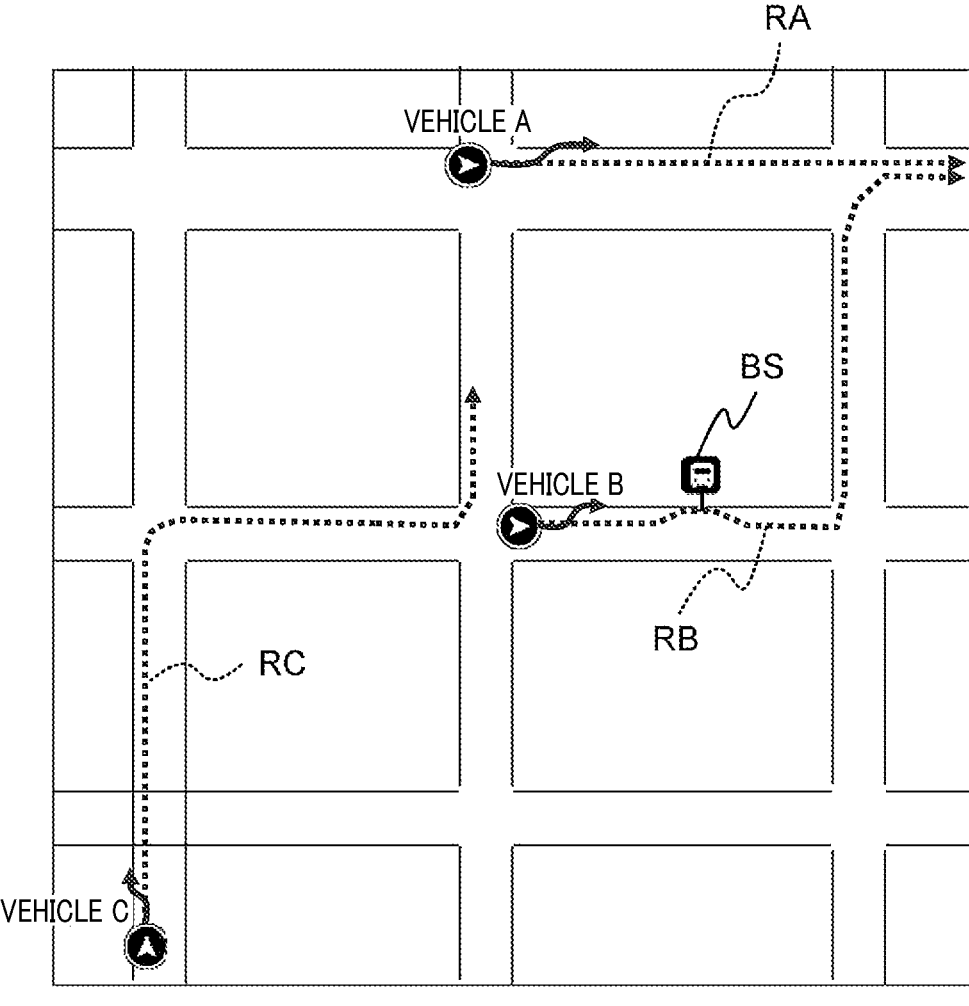
FIG. 4 is an illustration of a first example of the remote assistance process.

In the first example, it is assumed that different routes have been identified for respective vehicles A, B, and C by the route planner 62 of the remote assistance device 50, as illustrated in FIG. 4. In this example, a route RA is set for the vehicle A. For the vehicle B, a route RB via a bus stop BS is set. For the vehicle C, a route RC is set.

In such a case, the control unit 60 instructs the vehicles A, B, and C to stop when there are no available operators, and instructs the vehicles A, B, and C to restart travel or running when there are available operators. Stopping includes not only stopping immediately at the current location, but also stopping after reaching a safety zone. Here, the safety zone refers to a place that does not interfere with travel of the vehicle, such as a shoulder, a bus stop, or a parking lot.

Figure 5:
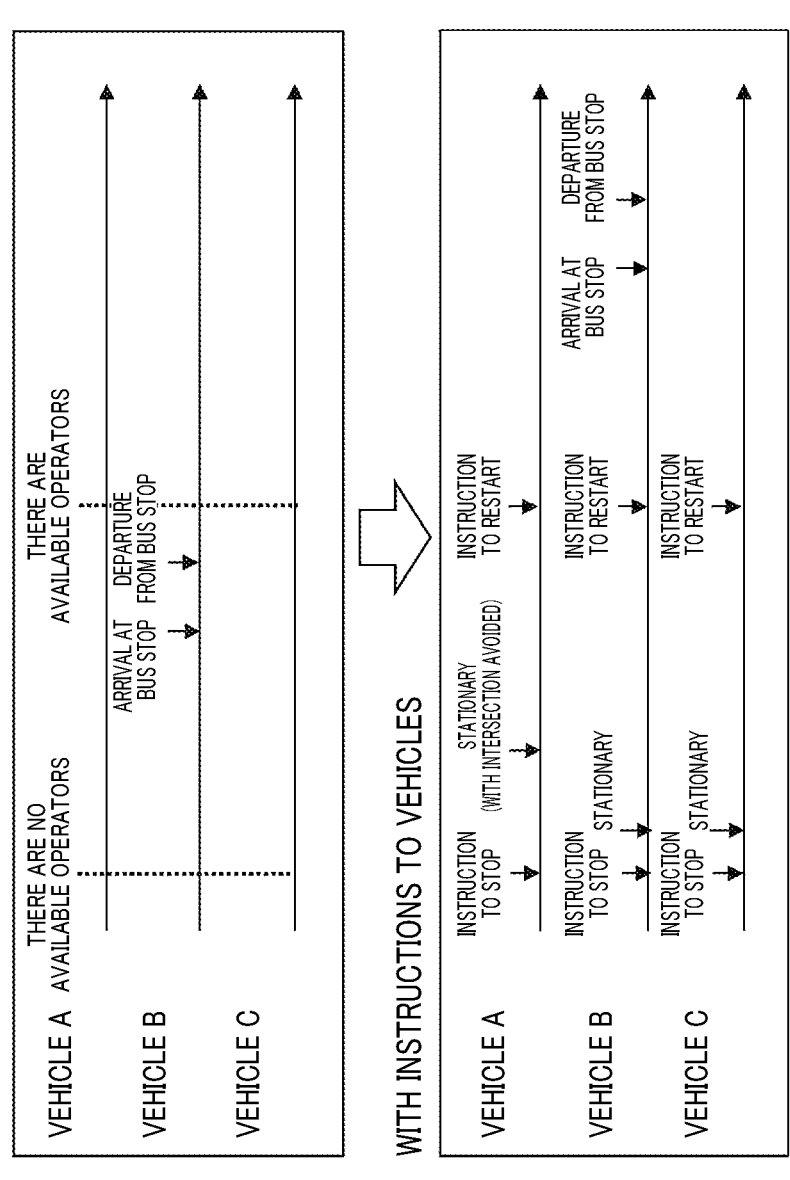
FIG. 5 is a timing chart of the first example of the remote assistance process.

FIG. 5 illustrates a time series of driving states of each vehicle, with and without instructions to the vehicle. The horizontal axis indicates time.

As illustrated in FIG. 5, the control unit 60 instructs the vehicles A, B, and C to stop when the number of available operators reaches zero (0). As illustrated in FIG. 4, this causes each vehicle to pull over to the shoulder as a safety zone, as indicated by the solid arrows. As illustrated in FIG.

4, the vehicle A is about to enter an intersection. To avoid the vehicle A stopping at the intersection, the control unit 60 instructs the vehicle A to travel to the safety zone beyond the intersection and then stop.

As illustrated in FIG. 5, when there are available operators, that is, the number of available operators is one or more, the control unit 60 instructs the vehicles A, B, and C to restart travel. The vehicles A, B, and C thus restart travel. Since there is a bus stop BS on the route RB, the vehicle B stops at the bus stop and then leaves the bus stop.

In this manner, when the number of available operators reaches zero, all the vehicles are instructed to stop. Thereafter, when the number of available operators becomes one or more, all the vehicles are instructed to restart travel or running. If there is an assistance point on the route of each vehicle, this can reduce the waiting time for assistance on the assistance point.

Second Example

In the second example, no instruction to stop is provided to a vehicle for which no assistance point exists on its route and no remote assistance is needed. A vehicle that has an assistance point on its route is instructed to stop.

Figure 6:
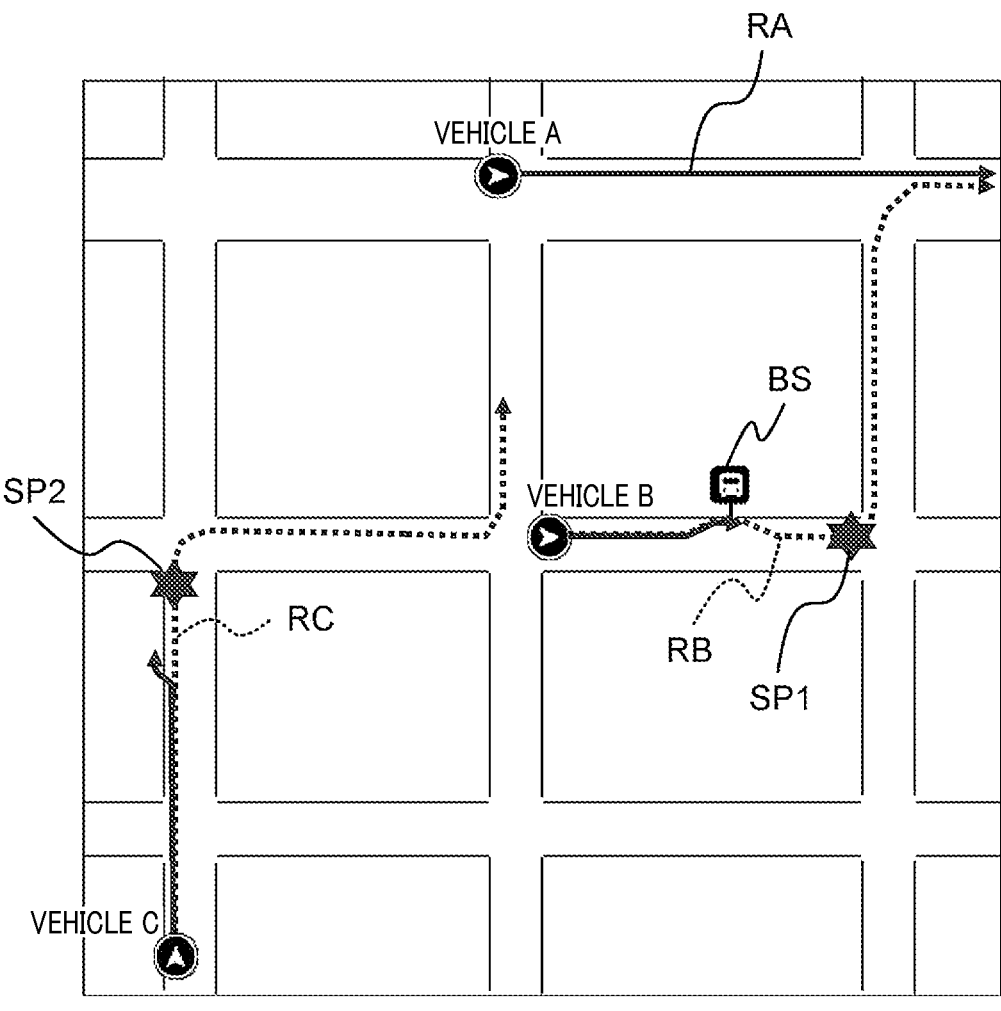
FIG. 6 is an illustration of a second example of the remote assistance process.

In the second example, as illustrated in FIG. 6, a route RA via no assistance point is set for the vehicle A. For the vehicle B, a route RB via a bus stop BS and an assistance point SP1 is set. For the vehicle C, a route RC via an assistance point SP2 is set.

Figure 7:
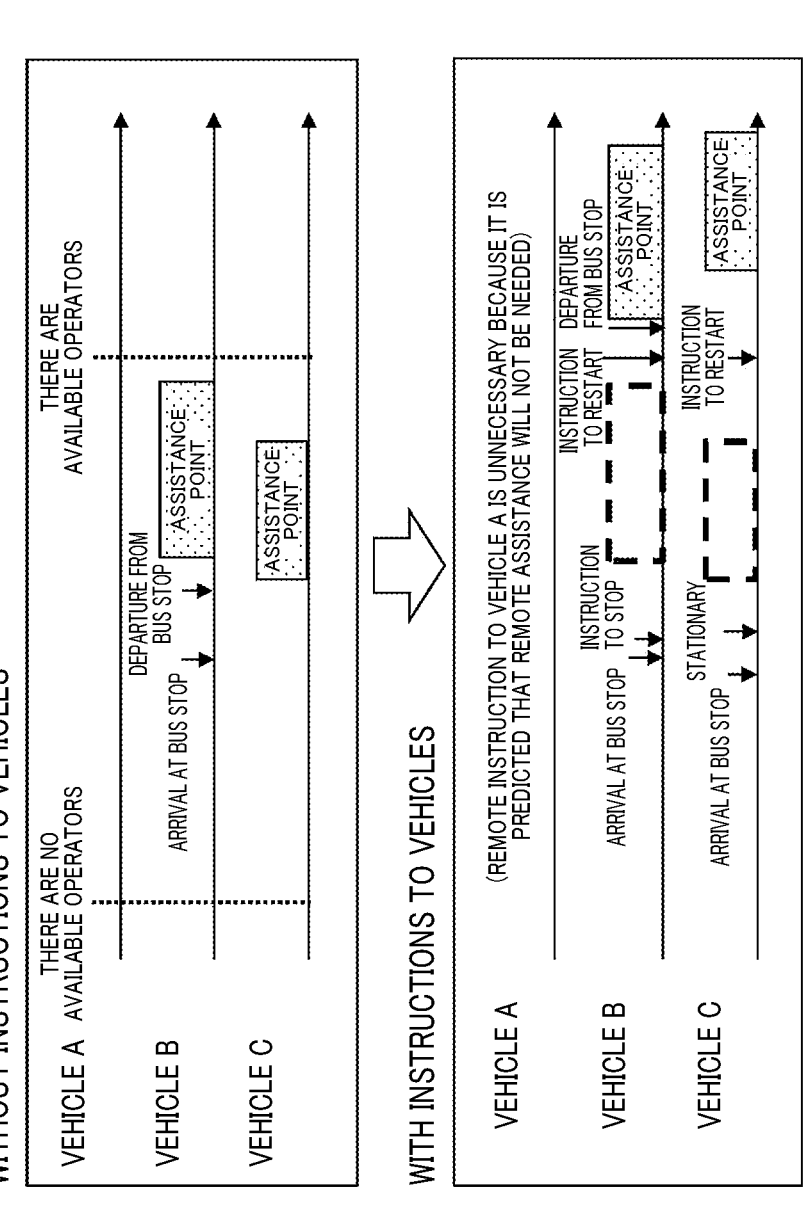
FIG. 7 is a timing chart of the second example of the remote assistance process.

As illustrated in FIG. 7, when there is no instruction to stop, the vehicle A continues to travel on the route RA without stopping, because there is no assistance point on the route RA. Since there is the bus stop BS and the assistance point SP1 on route RB, the vehicle B stops once at the bus stop BS and then leaves it, and receives remote assistance from an operator after arriving at the assistance point SP1. Since there is the assistance point SP2 on the route RC, the vehicle C receives remote assistance from an operator after arriving at the assistance point SP2 on the route RC. In FIG. 7, the width of the rectangular area with "assistance point" labelled and the background hatched represents the length of time required for remote assistance at the assistance point. As illustrated in FIG. 7, the time periods during which the vehicles B and C receive remote assistance overlap, resulting in a wait for assistance at the assistance points.

Therefore, as illustrated in FIG. 7, the remote assistance device 50 instructs the vehicle B to stop and remain stationary after arriving at the bus stop BS as a safety zone. The remote assistance device 50 instructs the vehicle C to stop immediately. For the vehicle A, since there is no assistance point on the route RA, there is no need to instruct the vehicle A to stop. For this reason, the remote assistance device 50 does not instruct the vehicle A to stop.

As indicated by the solid arrows in FIG. 6, the vehicle B stops after arriving at the bus stop. The vehicle C stops immediately. This can avoid overlaps of the time periods during which the vehicles B and C receive remote assistance. When the number of available operators becomes one or more, the remote assistance device 50 instructs the vehicle B to restart travel. This allows the vehicle B to leave the bus stop BS and immediately receive remote assistance from an operator without having to wait for assistance at the assistance point SP2. Although it is preferable that the time periods for receiving remote assistance do not overlap, they do not have to separate from each other provided that the overlap of the time periods for receiving remote assistance is reduced. The same applies to overlaps of subsequent time periods for receiving remote assistance.

Third Example

In the third example, no instruction to stop is provided to a vehicle for which no assistance point exists on its route and no remote assistance is needed. Of the vehicles that have assistance points on their routes, a vehicle that is allowed to make a route change to another route for avoiding the assistance point is instructed to change its route, and a vehicle that is not allowed to make any route change is instructed to stop.

Figure 8:
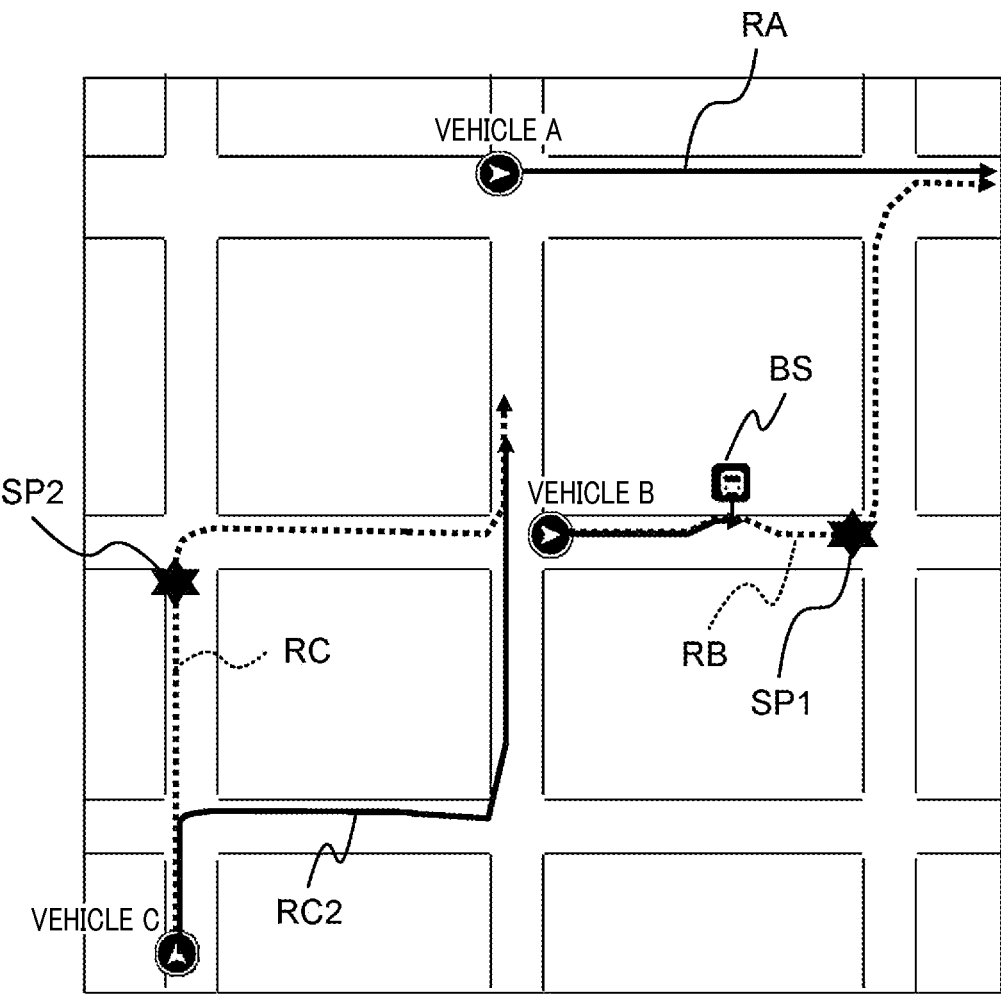
FIG. 8 is an illustration of a third example of the remote assistance process.

In the third example, as illustrated in FIG. 8, the same routes RA, RB, and RC as in FIG. 6 are set for the vehicles A, B, and C.

Figure 9:
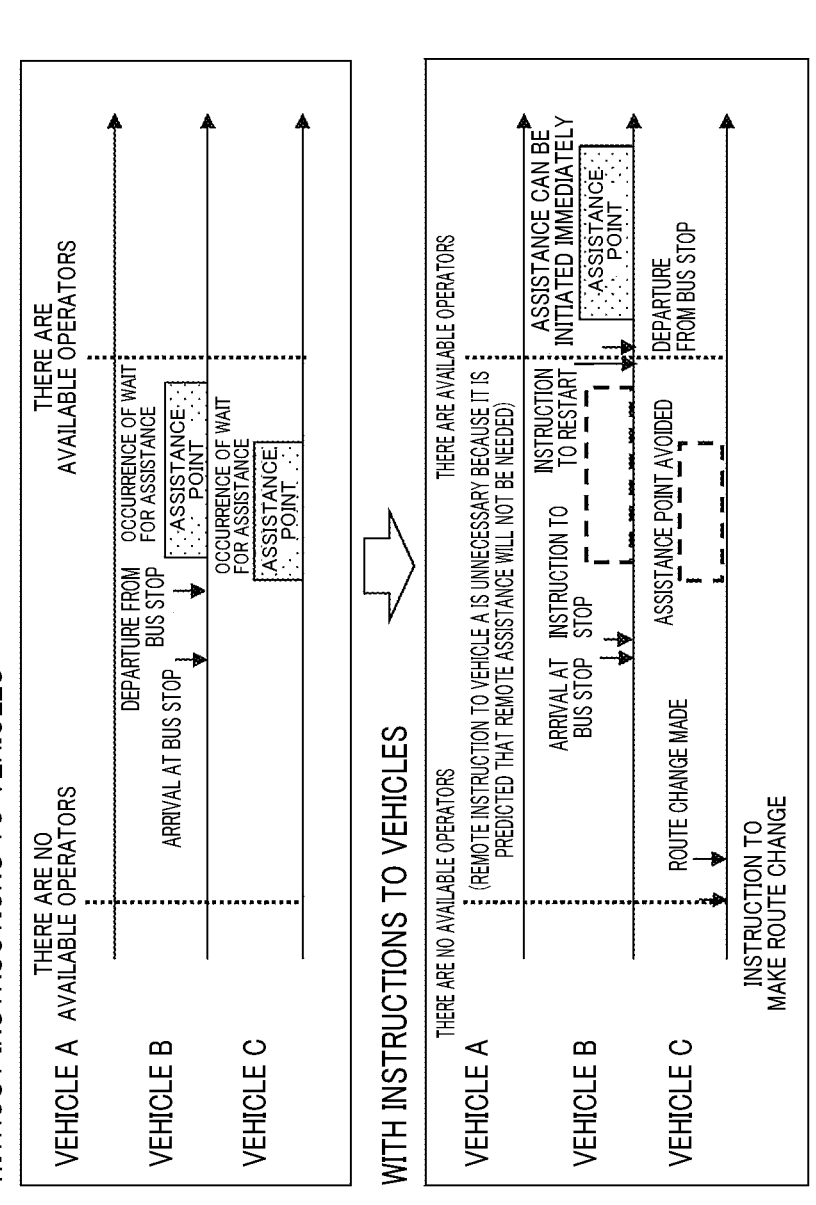
FIG. 9 is a timing chart of the third example of the remote assistance process.

As illustrated in FIG. 9, when there are no instructions to stop the vehicles, the description is the same as in FIG. 7 and will thus be omitted. The third example differs from the second example in the instructions to the vehicle C. Since the instructions to the vehicles A and B are the same as in the second example, the duplicate description thereof will be omitted.

For the vehicle C, as illustrated in FIG. 8, since another route RC2 for avoiding the assistance point SP2 can be set, the vehicle is instructed to make a route change from the route RC to the route RC2.

As illustrated in FIG. 9, the vehicle B stops after arriving at the bus stop. The vehicle C travels while avoiding the assistance point SP2. This allows the vehicles B and C to avoid an overlap of time periods during which they receive remote assistance. Thereafter, when the number of available operators becomes one or more, the vehicle B is instructed to restart travel. This allows the vehicle B to leave the bus stop BS and immediately receive remote assistance from an operator without having to wait for assistance at the assistance point SP1.

Forth Example

In the fourth example, the same routes RA, RB, and RC as in FIG. 8 are set.

Figure 10:
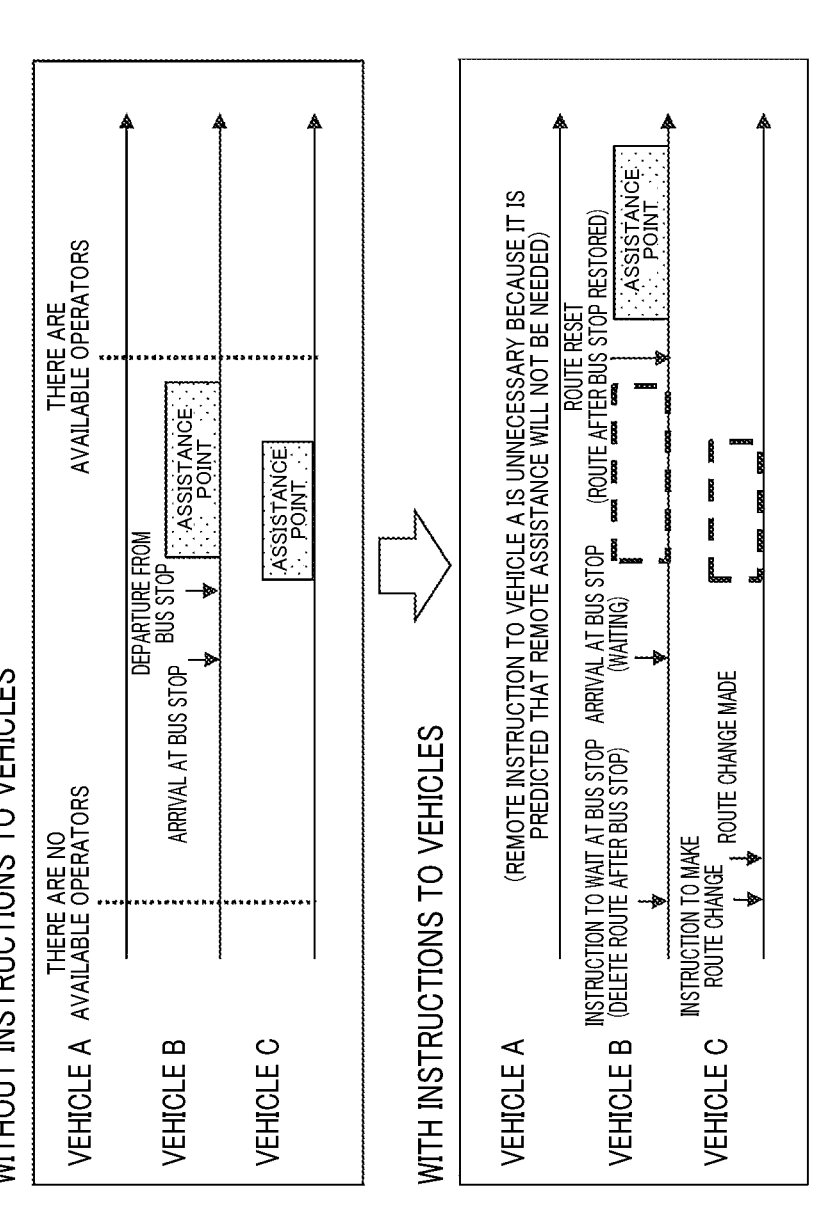
FIG. 10 is a timing chart of a fourth example of the remote assistance process.

As illustrated in FIG. 10, when there are no instructions to the vehicles, such as instructions to stop the vehicles, the description is the same as in FIG. 9 and will thus be omitted. The fourth example differs from the third example in the instructions to the vehicle B. Since the instructions to the vehicles A and C are the same as in the third example, the duplicate description thereof will be omitted.

For the vehicle B, as illustrated in FIG. 10, when the number of available operators reaches zero, the vehicle B is not instructed to stop, but instructed to delete the route after the bus stop BS from the route RB. The vehicle B will wait at the bus stop BS after arriving at the bus stop BS. Thereafter, when the number of available operators reaches one or more, the route after the bus stop BS is reset or set again, that is, restored. This allows the vehicle B to restart travel and receive remote assistance from an operator without having to wait for assistance at the assistance point SP1.

Fifth Example

In the Fifth Example, a case will now be described where, when it is predicted that there will be no more available operators, vehicles are instructed to stop or change their routes to reduce the overlap of time periods during which they receive remote assistance.

Figure 11:
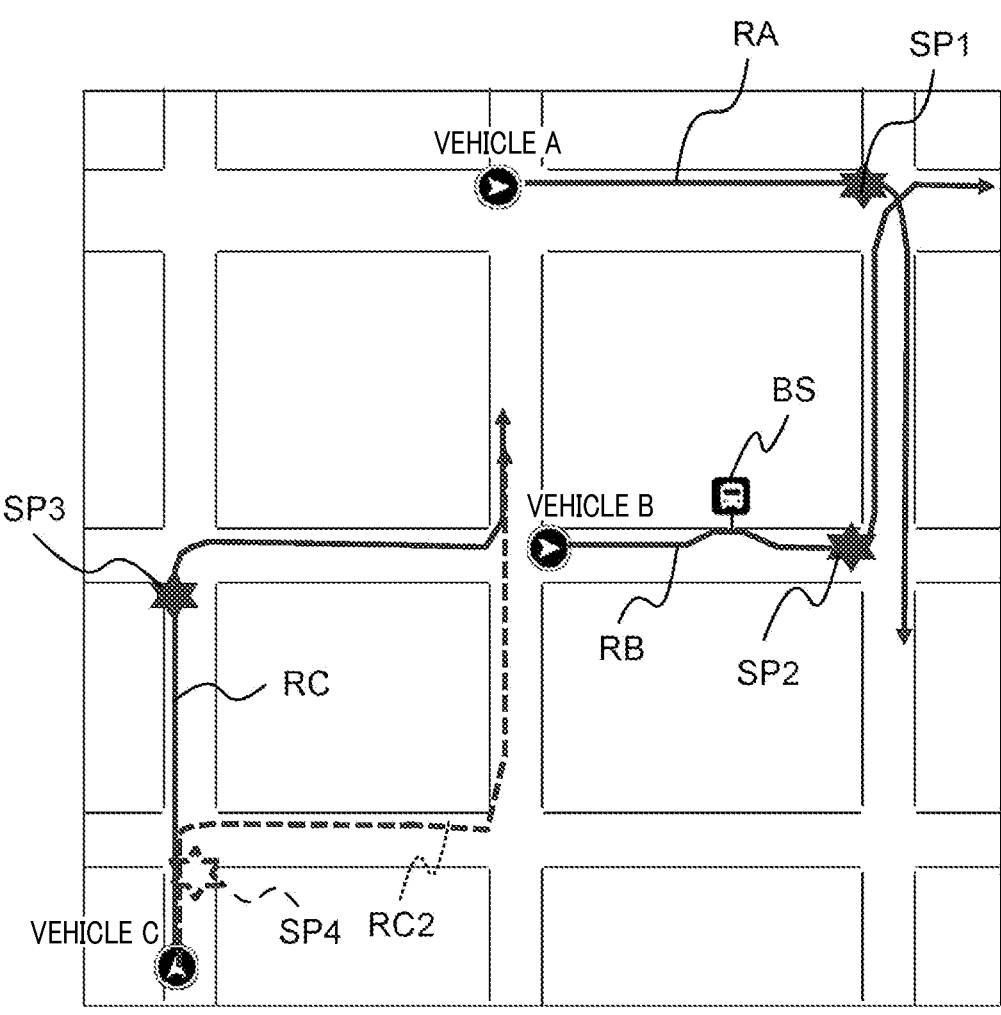
FIG. 11 is an illustration of a fifth example of the remote assistance process.

In the fifth example, as illustrated in FIG. 11, a route RA via an assistance point SP1 is set for the vehicle A. A route RB via a bus stop BS and an assistance point SP2 is set for the vehicle B. A route RC via an assistance point SP3 is set for the vehicle C.

In the fifth example, a situation will now be described in which one operator is scheduled to be allocated to the vehicle B because it is predicted that remote assistance is needed for the vehicle B, but it is newly found that remote assistance is also needed for the vehicles A and C, and it is predicted that there will be a shortage of two operators.

Figure 12:
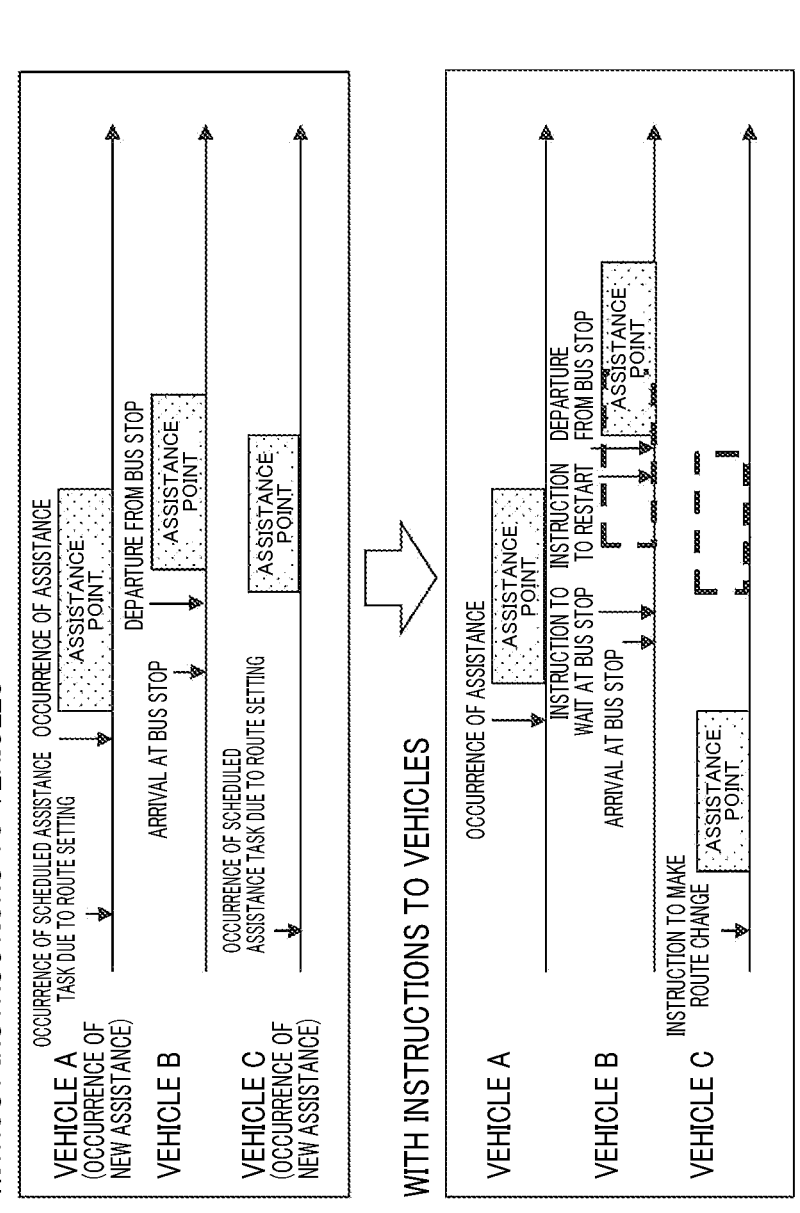
FIG. 12 is a timing chart of the fifth example of the remote assistance process.

As illustrated in FIG. 12, with no instructions to vehicles, such as instructions to stop vehicles, a scheduled assistance task occurs due to the route RA via the assistance point SP1 being set for the vehicle A. A scheduled assistance task occurs due to the route RB via the assistance point SP2 being set for the vehicle B. A scheduled assistance task occurs due to the route RC via the assistance point SP3 being set for the vehicle C. As such, a scheduled assistance task occurs for each of the vehicles A, B, and C. However, because only one operator is scheduled to be allocated, one of the three vehicles, A, B, and C, will not have to wait for assistance, but two vehicles will have to wait for assistance due to a shortage of operators.

As illustrated in FIG. 12, the control unit 60 does not instruct the vehicle A to stop, and allows the vehicle A to continue to travel. The control unit 60 instructs the vehicle B to wait at the bus stop BS. As illustrated in FIG. 11, the control unit 60 instructs the vehicle C to make a route change to a route RC2 via an assistance point SP4 before the assistance point SP3.

This allows the vehicle C to receive remote assistance earlier than when traveling the original route RC. Since the vehicle B waits at the bus stop BS, the timing of remote assistance is delayed. Instructing the vehicles B and C in this manner can avoid overlaps between time periods of remote assistance for the vehicles A, B, and C, as illustrated in FIG. 12. Therefore, even in a case where it is predicted that there is a shortage of two operators at the timing of the routes RA, RB, and RC being initially set, the shortage of operators can be avoided and waiting for assistance at the assistance points can be avoided.

In the case of the vehicle C that not allowed to change its route, such as a bus, it is not appropriate to change the route. For the vehicle C that is not allowed to change its route, such as a bus, instead of instructing the vehicle C to change its route, the control unit 60 may instruct the vehicle C to travel at a lower speed than the set speed so that the vehicle C will arrive at the assistance point SP3 after completion of remote assistance of vehicle B.

Sixth Example

In the sixth example, a configuration will now be described in which instructions to vehicles are controlled based on probabilities of occurrence of assistance at assistance points.

Figure 13:
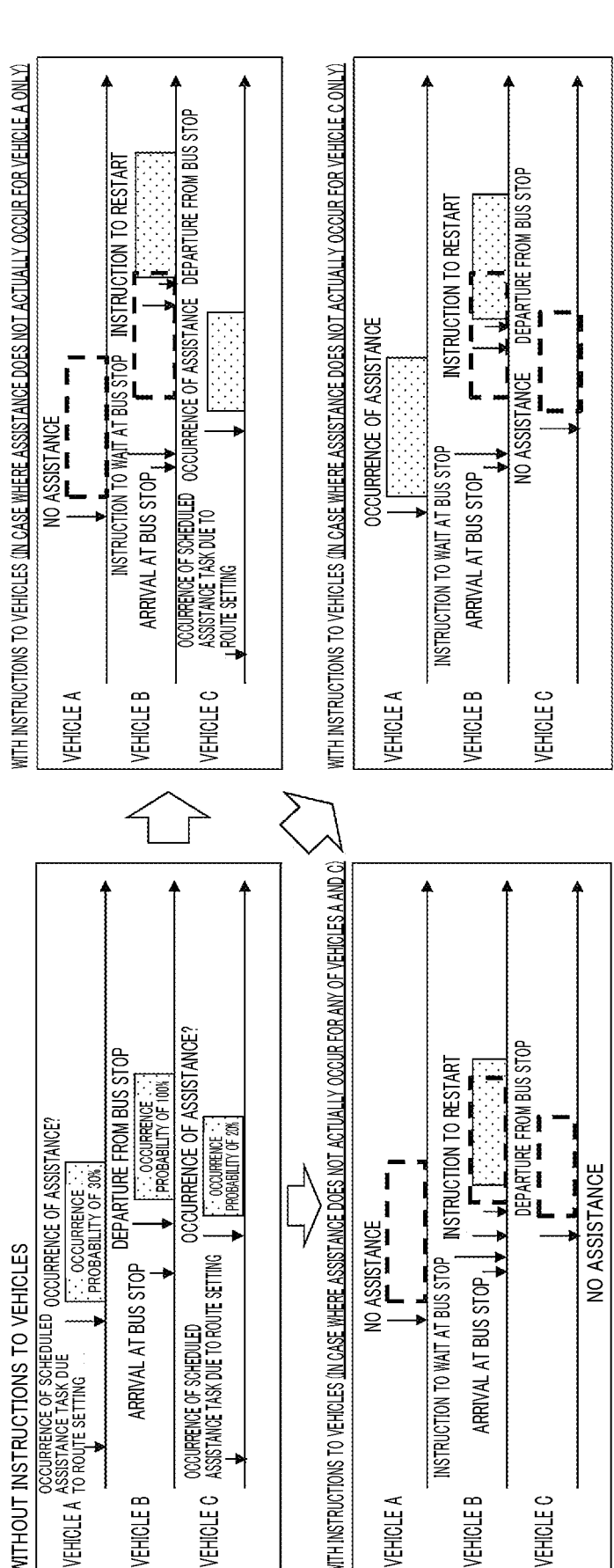
FIG. 13 is a timing chart of a sixth example of the remote assistance process.

In the sixth example, for example, as illustrated in the timing chart in the upper left portion of FIG. 13, with no instructions to the vehicles, it is assumed for the vehicle A that a scheduled assistance task occurs due to the route RA being set as in FIG. 11 and the probability of occurrence of assistance is 30%. It is assumed for the vehicle B that a scheduled support task occurs due to the route RB being set as in FIG. 11 and the probability of occurrence of assistance is 100%. It is assumed for the vehicle C that a scheduled support task occurs due to the route RC being set as in FIG.

11 and the probability of the occurrence of the assistance is 20%. It is further assumed for the vehicle B that an operator is allocated and scheduled to provide assistance, but it is assumed for the vehicles A and C that no operators fail to be allocated and thus there will be a shortage of two operators.

In such a case, when the probability of occurrence of assistance is lower than or equal to a predefined threshold (e.g., 30%), the control unit 60 withholds instructions until it is known the presence or absence of occurrence of assistance at assistance points. Thus, for the vehicles A and C, since the probability of occurrence of assistance is lower than or equal to 30% and thus there is a high probability that remote assistance will not occur, instructions to vehicles A and C are withheld until receipt of a notification of the presence or absence of occurrence of assistance.

In this case, as illustrated in the timing chart in the upper right portion of FIG. 13, it is assumed that remote assistance has not actually occurred for the vehicle A only. In this case, remote assistance occurs for the vehicle C before remote assistance occurs for the vehicle B, but the time periods of remote assistance for the vehicles B and C overlap. Then, the vehicle B is instructed to wait at the bus stop BS. After remote assistance for the vehicle C is completed, the vehicle B is instructed to restart travel. This can avoid the overlap of the time periods of remote assistance for the vehicles B and C, and can avoid a shortage of operators. In addition, since the instruction to the vehicle A is withheld until it is known that there is no remote assistance, unnecessary instructions can be avoided.

It is assumed that remote assistance does not actually occur for vehicle C only, as illustrated in the timing chart in the lower right portion of FIG. 13. In this case, remote assistance occurs for the vehicle A before remote assistance occurs for the vehicle B, but the time periods of remote assistance for the vehicles A and B overlap. Then, the vehicle B is instructed to wait at the bus stop BS. After the remote assistance for vehicle A is completed, the vehicle B is instructed to restart travel. This can avoid the overlap of the time periods of remote assistance for the vehicles A and C, and can avoid a shortage of operators. In addition, since the instruction to the vehicle C is withheld until it is known that there is no remote assistance, unnecessary instructions can be avoided.

It is assumed that remote assistance does not actually occur for any of the vehicles A and C, as illustrated in the timing chart in the lower left portion of FIG. 13. In this case, the vehicle B arrives at the bus stop BS after it is known that remote assistance for the vehicle A has not occurred. Since at that point it is undetermined whether remote assistance for the vehicle C occurs, the time periods of remote assistance for the vehicles B and C may overlap. Then, the vehicle B is instructed to wait at the bus stop BS. Thereafter, when it is known that remote assistance for the vehicle C does not occur, the vehicle B is instructed to restart travel. In addition, instructions to the vehicles A and C are withheld until it is known that there is no remote assistance, which can avoid providing unnecessary instructions.

The remote assistance device 50 can provide remote assistance to each of the vehicles 10 by repeatedly performing the remote assistance process described above.

The remote assistance device 50 according to the present embodiment described above is configured to, when there are no available operators or when it is predicted that there will be no available operators that provide remote assistance, control driving of the vehicles 10 so as to prevent occurrence of a shortage of operators at respective assistance points. This can reduce a waiting time for assistance at assistance points, which leads to improved safety and smooth operations with remote assistance.

The present disclosure is not limited to the embodiments set forth above, and various modifications and applications are possible without departing from the scope of the present disclosure.

In addition, the configuration of the autonomous driving system 100 (see FIG. 1) described in the above embodiment is just an example, and it goes without saying that unnecessary parts may be deleted or new parts may be added without departing from the scope of the present disclosure.

The process flow of the remote assistance program 76 described in the above embodiment (see FIG. 3) is also an example, and it goes without saying that unnecessary steps may be deleted, new steps may be added, or the order of the steps may be changed without departing from the scope of the present disclosure.

What is claimed is:

1. A remote assistance device for remotely assisting autonomous driving of an autonomous driving vehicle, comprising:
  a control unit configured to, when it is predicted that there will be a shortage of operators who are available to provide remote assistance to the autonomous driving vehicle, control driving of the autonomous driving vehicle so as to prevent occurrence of a shortage of operators at an assistance point where the autonomous driving vehicle receives remote assistance.

2. The remote assistance device according to claim 1, wherein
  the control unit is configured to, when there is no available operator that provides remote assistance to the autonomous driving vehicle, instruct the autonomous driving vehicle to stop travel, and when there becomes an available operator that provides remote assistance to the autonomous driving vehicle, instruct the autonomous driving vehicle to restart travel.

3. The remote assistance device according to claim 2, wherein
  the control unit is configured to instruct the autonomous driving vehicle to stop travel when the assistance point is present on a route traveled by the autonomous driving vehicle.

4. The remote assistance device according to claim 3, wherein
  the control unit is configured to instruct the autonomous driving vehicle to travel to a safety zone on the route to stop travel after reaching the safety zone.

5. The remote assistance device according to claim 3, wherein
  the control unit is configured to instruct the autonomous driving vehicle to stop travel by instructing the autonomous driving vehicle to delete the route, and when there becomes an available operator, instruct the autonomous driving vehicle to restart travel by instructing the autonomous driving vehicle to restore the route.

6. The remote assistance device according to claim 1, wherein
  the control unit is configured to, when there is another route for the autonomous driving vehicle to avoid the assistance point, instruct the autonomous driving vehicle to make a route change to the other route.

7. The remote assistance device according to claim 1, wherein
  the control unit is configured to, when it is predicted that there will be no more available operators, control driving of at least one of a plurality of autonomous driving vehicles so as to reduce overlaps of time periods of remote assistance for the plurality of the autonomous driving vehicles.

8. The remote assistance device according to claim 7, wherein the control unit is configured to instruct the at least one of the plurality of the autonomous driving vehicles to stop travel.

9. The remote assistance device according to claim 7, wherein the control unit is configured to, when there is another route for the at least one of the plurality of the autonomous driving vehicles to avoid the assistance point, instruct the at least one of the plurality of the autonomous driving vehicles to make a route change to the other route.

10. The remote assistance device according to claim 7, wherein the control unit is configured to control driving of each of the plurality of the autonomous driving vehicles based on a probability of occurrence of assistance at the assistance point.

11. The remote assistance device according to claim 10, wherein the control unit is configured to withhold an instruction until it is known presence or absence of occurrence of assistance at the assistance point.

12. The remote assistance device according to claim 7, wherein the control unit is configured to instruct the at least one of the plurality of the autonomous driving vehicles to travel at a speed lower than a set speed.

13. The remote assistance device according to claim 1, wherein the control unit is configured to, when a number of available operators is less than a number of occurrences of remote assistance scheduled to occur at a same time, select a specific number of autonomous driving vehicles with the specific number equal to a shortage number of operators to provide vehicle instructions to the specific number of the autonomous driving vehicles.

14. The remote assistance device according to claim 1, wherein the control unit is configured to provide vehicle instructions to a specific number of autonomous driving vehicles with the specific number equal to a shortage number of operators, among a plurality of the autonomous driving vehicles for which remote assistance is predicted to occur, in order of the autonomous driving vehicles with a least impact on feasibility of services related to autonomous driving.

15. The remote assistance device according to claim 1, wherein the control unit is configured to, when there is no available operator or when it is predicted that there will be no available operator, and also when there are a plurality of selectable vehicle instructions, select one of the plurality of selectable vehicle instructions according to a length of time period before remote assistance is initiated.

16. The remote assistance device according to claim 1, wherein the control unit is configured to, when there is no available operator or when it is predicted that there will be no available operator, and also when there are a plurality of selectable vehicle instructions, select one of the plurality of selectable vehicle instructions according to an impact on feasibility of services related to autonomous driving.

17. The remote assistance device according to claim 1, wherein the control unit is configured to provide vehicle instructions that minimize an impact on an overall service that a plurality of autonomous driving vehicles are involved in.

18. A computer-implemented method for remotely assisting autonomous driving of an autonomous driving vehicle, comprising:

when it is predicted that there will be a shortage of operators who are able to provide remote assistance to the autonomous driving vehicle, controlling driving of the autonomous driving vehicle so as to prevent occurrence of a shortage of operators at an assistance point where the autonomous driving vehicle receives remote assistance.

19. A non-transitory computer-readable medium comprising instructions for performing a method for remotely assisting autonomous driving of an autonomous driving vehicle, the method comprising:

when it is predicted that there will be a shortage of operators who are able to provide remote assistance to the autonomous driving vehicle, controlling driving of the autonomous driving vehicle so as to prevent occurrence of a shortage of operators at an assistance point where the autonomous driving vehicle receives remote assistance.

20. A remote assistance device for remotely assisting autonomous driving of an autonomous driving vehicle, comprising:

a non-transitory memory storing one or more computer programs;

a processor executing the one or more computer programs to:

when it is predicted that there will be a shortage of operators who are able to provide remote assistance to the autonomous driving vehicle, control driving of the autonomous driving vehicle so as to prevent occurrence of a shortage of operators at an assistance point where the autonomous driving vehicle receives remote assistance.

* * * * *